(12) United States Patent
Linnen et al.

(10) Patent No.: US 12,248,397 B2
(45) Date of Patent: Mar. 11, 2025

(54) RECORD AND PLAYBACK COMMANDS FOR STORAGE DEVICES

(71) Applicant: Western Digital Technologies, Inc., San Jose, CA (US)

(72) Inventors: Daniel J. Linnen, Limestone, TN (US); Ramanathan Muthiah, Bangalore (IN); Niles Yang, Mountain View, CA (US); Judah Gamliel Hahn, Ofra (IL); Mark Shlick, Ganey-Tikva (IL)

(73) Assignee: Sandisk Technologies, Inc., Milpitas, CA (US)

( * ) Notice: Subject to any disclaimer, the term of this patent is extended or adjusted under 35 U.S.C. 154(b) by 53 days.

(21) Appl. No.: 18/361,531

(22) Filed: Jul. 28, 2023

(65) Prior Publication Data

US 2025/0036564 A1    Jan. 30, 2025

(51) Int. Cl.
G06F 12/02 (2006.01)
(52) U.S. Cl.
CPC .............. *G06F 12/0292* (2013.01); *G06F 2212/2022* (2013.01)
(58) Field of Classification Search
CPC .............. G06F 12/0292; G06F 2212/2022
See application file for complete search history.

(56) References Cited

U.S. PATENT DOCUMENTS

| | | | |
|---|---|---|---|
| 8,291,194 B2 | 10/2012 | Tsai et al. | |
| 8,292,177 B2 | 10/2012 | Elhamias et al. | |
| 9,526,995 B2 | 12/2016 | Brunstetter et al. | |
| 9,547,459 B1 | 1/2017 | Benhanokh et al. | |
| 10,282,096 B1 | 5/2019 | Boyle | |
| 10,572,185 B2 | 2/2020 | Hahn et al. | |
| 10,990,294 B2 | 4/2021 | Hahn et al. | |
| 2015/0142860 A1* | 5/2015 | George | G06F 11/14 707/812 |
| 2022/0292020 A1* | 9/2022 | Muthiah | G06F 12/1009 |

* cited by examiner

*Primary Examiner* — Jane W Benner
(74) *Attorney, Agent, or Firm* — Michael Best & Friedrich LLP

(57) ABSTRACT

Methods for recording commands in memory and providing the recorded commands. In one embodiment, a data storage controller includes a memory interface configured to interface with a memory, a controller memory including a storage firmware and a record mapping table, and a processor. The processor, when executing the storage firmware, is configured to receive a record identifier, receive a command including data to be stored in the memory, and create an entry in the record mapping table associating the record identifier with a logical block address of the command. The command is received after the record identifier. The processor may receive a playback identifier that includes the record identifier and determine, using the record mapping table, a location of the associated command in the memory. The command is provided to an external device.

20 Claims, 8 Drawing Sheets

RECORD AND PLAYBACK COMMANDS FOR STORAGE DEVICES

FIELD

This application relates generally to data storage devices and, more particularly, to record and playback commands for data storage devices.

SUMMARY

When host devices write data to or read data from data storage devices, the host device transmits a command that is understood by the data storage device. The command may indicate whether incoming data is to be written to memory, a location to which the data is to be written, instructions for writing the data, a request for data, and the like. Additionally, the data written to memory may indicate further actions to be performed.

In some applications, data access patterns remain consistent, and command sequences to access logical data are likely repeated over time. For example, in gaming applications, for a given level, the same data is fetched from storage at different points in time, often without any sequence change. Such repetition may be addressed by sending repeated commands in sequence and retrieving the corresponding data. However, sending repeated commands in sequence may result in the overhead in command handling that involves the associated device experiencing interrupts. Additionally, an error may occur, impacting the performance of the data storage device.

Embodiments described herein provide a means for knowing which commands are in the command pipeline such that commands may be appropriately scheduled. Such embodiments provide for a more efficient use of background activity, allowing for better plane, die, channel, and buffer utilization. Additionally, caching may be implemented such that data is appropriately stored for high-speed access.

The disclosure provides a data storage controller including, in one embodiment, a memory interface configured to interface with a memory, a controller memory including a storage firmware and a record mapping table, and a processor communicatively connected to the controller memory. The processor, when executing the storage firmware, is configured to receive a record identifier, receive a command including data to be stored in the memory, the command received after the record identifier, and create an entry in the record mapping table associating the record identifier with a logical block address of the command.

The disclosure also provides a method comprising receiving, with a storage controller executing a software firmware, a record identifier, receiving, with the storage controller, a command including data to be stored in a memory, the command received after the record identifier, and creating, with the storage controller, an entry in a record mapping table associating the record identifier with a logical block address of the command.

The disclosure also provides a memory device that supports a record mapping table for records indicating a sequence of commands. The memory device comprises a host interface configured to connect to a host device, a memory including the record mapping table and a flash translation layer, and a controller coupled to the memory and the host interface. The controller is configured to receive, from the host device, a record identifier, receive, from the host device, the sequence of commands including data, the sequence of commands received after the record identifier, and create an entry in the record mapping table associating the record identifier with a logical block address of the sequence of commands.

In this manner, various aspects of the disclosure provide for improvements in at least the technical fields of data storage devices and their design and architecture. The disclosure can be embodied in various forms, including hardware or circuits controlled by firmware (i.e., code executing on a processor), and computer systems and networks; as well as hardware-implemented methods, signal processing circuits, memory arrays, application specific integrated circuits, field programmable gate arrays, and the like. The foregoing summary is intended solely to give a general idea of various aspects of the disclosure, and does not limit the scope of the disclosure in any way.

DETAILED DESCRIPTION

In the following description, numerous details are set forth, such as data storage device configurations, controller operations, and the like, in order to provide an understanding of one or more aspects of the present disclosure. It will be readily apparent to one skilled in the art that these specific details are merely exemplary and not intended to limit the scope of this application. In particular, the functions associated with the memory device may be performed by hardware (e.g., analog or digital circuits), a combination of hardware and software (e.g., program code or firmware, stored in a non-transitory computer-readable medium, that is executed by processing or control circuitry), or any other suitable means. The following description is intended solely to give a general idea of various aspects of the disclosure, and does not limit the scope of the disclosure in any way.

Data Storage Devices

Figure 1:
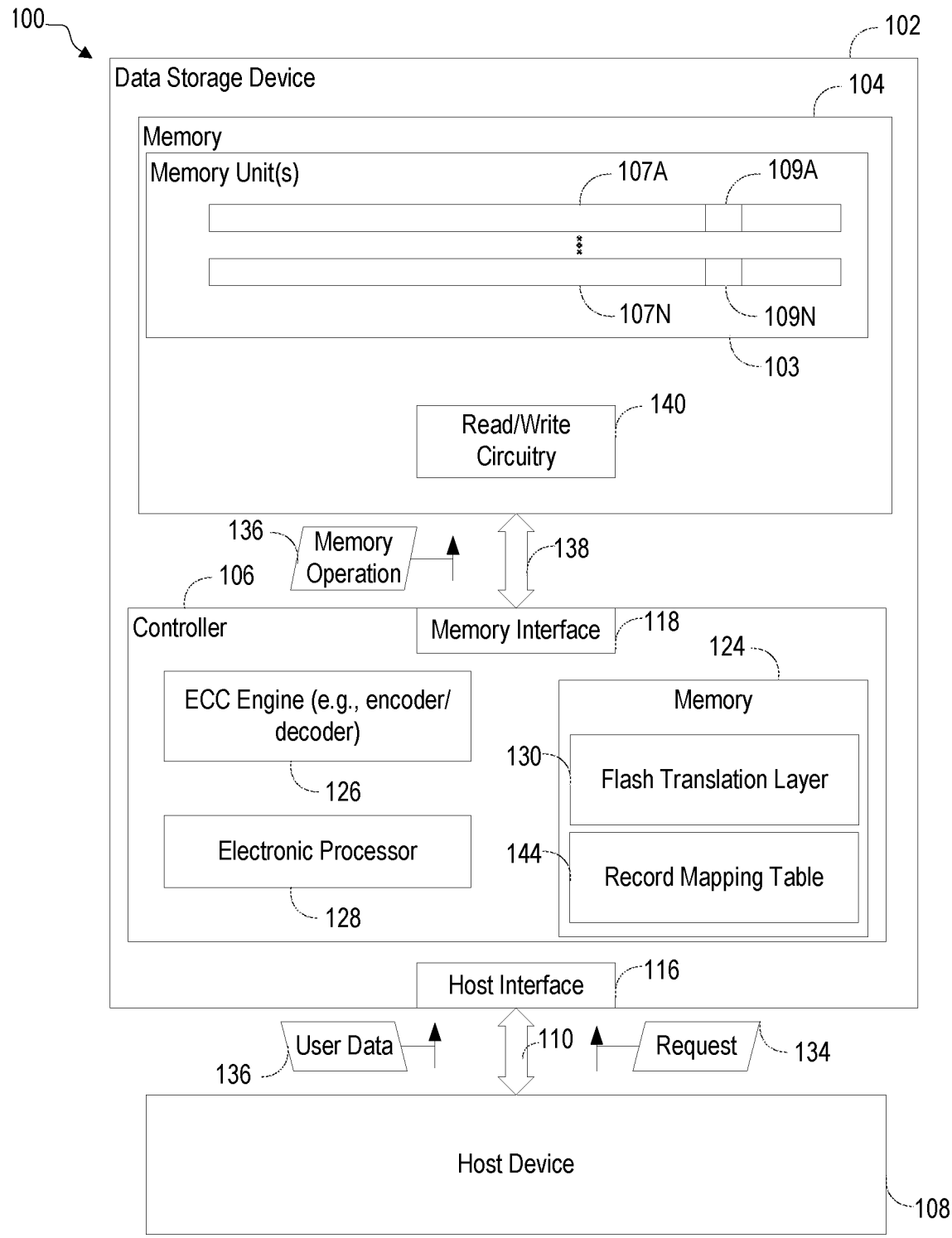
FIG. 1 is block diagram of a system including a data storage device, in accordance with some embodiments of the disclosure.

FIG. 1 is a block diagram of one example of a system 100 that includes a data storage device 102. In some implementations, the data storage device 102 is a flash memory device. For example, the data storage device 102 is a Secure Digital SD® card, a microSD® card, or another similar type of data storage device. The data storage device 102 illustrated in FIG. 1 includes a memory 104 (e.g., a non-volatile memory) and a controller 106 (referred to hereinafter as "data storage device controller") coupled to the memory 104.

One example of the structural and functional features provided by the data storage device controller 106 are illustrated in FIG. 1. However, the data storage device controller 106 is not limited to the structural and functional features provided by the data storage device controller 106 in FIG. 1. The data storage device controller 106 may include fewer or additional structural and functional features that are not illustrated in FIG. 1.

The data storage device 102 is coupled to a host device 108 (for example, an external electronic device). The data storage device 102 and the host device 108 may be operationally coupled with a connection (e.g., a communication path), such as a bus or a wireless connection. In some examples, the data storage device 102 may be embedded within the host device 108. Alternatively, in other examples, the data storage device 102 may be removably from the host device 108 (i.e., "removably" coupled to the host device 108). As an example, the data storage device 102 may be removably coupled to the host device 108 in accordance with a removable universal serial bus (USB) configuration. In some implementations, the data storage device 102 may include or correspond to a solid state drive (SSD), which may be used as an embedded storage drive (e.g., a mobile embedded storage drive), an enterprise storage drive (ESD), a client storage device, a cloud storage drive, or other suitable storage drives.

The host device 108 may include an electronic processor and a memory. The memory may be configured to store data and/or instructions that may be executable by the electronic processor. The memory may be a single memory or may include one or more memories, such as one or more non-volatile memories, one or more volatile memories, or a combination thereof. The host device 108 is configured to provide data 110 (for example, user data 136) to the data storage device 102 to be stored, for example, in the memory 104. The host device 108 may issue one or more commands to the data storage device 102, such as one or more requests 134 to erase data at, read data from, or write data to the memory 104 of the data storage device 102. For example, the one or more requests 134 may include record commands, playback commands, and other example commands described herein. Additionally, the host device 108 may be configured to provide data, such as the user data 132, to be stored at the memory 104 or to request data to be read from the memory 104. The host device 108 is, for example, a smart phone, a music player, a video player, a gaming console, an e-book reader, a personal digital assistance device, a tablet, a notebook computer, or another similar device.

The host device 108 communicates with a memory interface that enables reading from the memory 104 and writing to the memory 104. In some examples, the host device 108 may operate in compliance with an industry specification, such as a Universal Flash Storage (UFS) Host Controller Interface specification. In other examples, the host device 108 may operate in compliance with one or more other specifications, such as a Secure Digital (SD) Host Controller specification or other suitable industry specification. The host device 108 may also communicate with the memory 104 in accordance with any other suitable communication protocol.

The memory 104 of the data storage device 102 may include a non-volatile memory (e.g., NAND, BiCS family of memories, or other suitable memory). In some examples, the memory 104 may be any type of flash memory. For example, the memory 104 may be two-dimensional (2D) flash memory or three-dimensional (3D) flash memory. The memory 104 may include one or more memory dies 103. Each of the one or more memory dies 103 may include one or more blocks. Each block may include one or more groups of storage elements, such as a representative group of storage elements 107A-107N. The group of storage elements 107A-107N may be configured as a word line. The group of storage elements 107A-107N may include multiple storage elements (e.g., memory cells that are referred to herein as a "string"), such as representative storage elements 109A and 109N, respectively. In some implementations, the storage element 109 is a multi-level cell flash memory, such as a 2 levels cell ("SLC"), a 4 levels cell ("MLC"), an 8 levels cell ("TLC"), a 16 levels cell ("QLC"), or a flash memory cell having a larger number of bits per cell (for example, between five and ten bits per cell). In some instances, the memory 104 may be another type of memory, such as magnetoresistive RAM (MRAM), resistive RAM (ReRAM), phase change memory (PCM), or hard disk drive (HDD) memory.

The memory 104 may include support circuitry, such as read/write circuitry 140, to support operation of the one or more memory dies 103. Although depicted as a single component, the read/write circuitry 140 may be divided into separate components of the memory 104, such as read circuitry and write circuitry. The read/write circuitry 140 may be external to the one or more memory dies 103 of the memory 104. Alternatively, one or more individual memory dies may include corresponding read/write circuitry that is operable to read from and/or write to storage elements within the individual memory die independent of any other read and/or write operations at any of the other memory dies.

The data storage device 102 includes the data storage device controller 106 coupled to the memory 104 (e.g., the one or more memory dies 103) with a bus 138 and a memory interface 122 (e.g., interface circuitry), another structure, or a combination thereof. For example, the bus 138 may include multiple distinct channels to enable the data storage device controller 106 to communicate with each of the one or more memory dies 103 in parallel with, and independently of, communication with the other memory dies 103.

The data storage device controller 106 is configured to send data and commands (e.g., the memory operation 136) to the memory 104 with the memory interface 122. For example, the data storage device controller 106 is configured to send data and a write command to cause the memory 104 to store data to a specified address of the memory 104 with the memory interface 122. The write command may specify a physical address of a portion of the memory 104 (e.g., a physical address of a word line of the memory 104) that is to store the data.

The data storage device controller 106 is configured to send a read command to the memory 104 to access data from a specified address of the memory 104 with the memory interface 122. The read command may specify the physical address of a region of the memory 104 (e.g., a physical address of a word line of the memory 104, a logical block address). The data storage device controller 106 may also be configured to send data and commands to the memory 104 associated with background scanning operations, garbage collection operations, and/or wear-leveling operations, or other suitable memory operations with the memory interface 122.

The data storage device controller 106 is configured to receive data and instructions from the host device 108 and to send data to the host device 108 with the host interface 118. For example, the data storage device controller 106 may send data to the host device 108 with the host interface 118, and the data storage device controller 106 may receive data from the host device 108 with the host interface 118.

The data storage device controller 106 illustrated in FIG. 1 includes an error code correction (ECC) engine 126, a memory 124, and an electronic processor 128. The memory 124 may be configured to store data and/or instructions that may be executable by the electronic processor 128. The memory 124 may include flash translation layer 130 and record mapping table 144. The flash translation layer 130 may be a hardware circuit or instructions that are executable by the electronic processor 128. The flash translation layer 130 may manage data stored in the record mapping table 144. The record mapping table 144 includes mapping entries for received record identifiers, as described below in more detail. Additionally, the flash translation layer 130 may handle optimization of data from the host device 108 to manage records, and may retrieve commands from the memory 104 based on entries within the record mapping table 144, as described below in more detail. In some instances, the memory 124 includes another type of memory software or firmware, for example, firmware for MRAM, ReRAM, PCM or HDD memory.

The electronic processor 128 may be, for example, a microprocessor, a microcontroller, a field-programmable gate array ["FPGA"] semiconductor, an application specific integrated circuit ["ASIC"], or another suitable programmable device. The memory 124 may be a non-transitory computer readable medium (for example, including random access memory ["RAM"] and read only memory ["ROM"]). The electronic processor 128 is operatively connected to the various modules within the data storage device controller 106 and the data storage device 102. For example, firmware is loaded in a ROM of the memory 124 as computer executable instructions. Those computer executable instructions are capable of being retrieved from the memory 124 and executed by the electronic processor 128 to control the operation of the data storage device 102 and perform the processes described herein. In some implementations, one or more modules of the data storage device controller 106 correspond to separate hardware components within the data storage device controller 106. In other implementations, one or more modules of the data storage device controller 106 correspond to software stored within the memory 124 and executed by the electronic processor 128. The memory 124 is configured to store data used by the electronic processor 128 during operation.

Record Commands

Embodiments described herein provide for "record" commands that group multiple commands (e.g., records) stored for future retrieval. The commands may belong to different logical regions of the memory 104 and may be of different lengths. However, by grouping the commands as a record provides for reducing system overheads for both the data storage device 102 and the host device 108. "Record command" as used herein refers to a record indicator that, when received by the data storage device controller 106, initiates a record operation, i.e., a write operation.

For example, with reference to FIG. 1, the host device 108 issues a record command to the data storage device 102 prior to issuing a group of related commands. In some instances, the host device 108 issues a record command when the host device 108 determines a standard pattern of data access requests across a certain logical address. By grouping the commands with a record command, the host device 108 associates the respective data, metadata, and dependent data for a given application to be performed by the data storage device controller 106.

The data storage device controller 106 tracks the received commands for a given record with the record mapping table 144. In some instances, the flash translation layer 130 routes data associated with a record into a common data stream such that the data can be accessed sequentially. Once a record is created, there is only a single submission, completion, and acknowledgement for the entire record, reducing command overheads.

Figure 2:
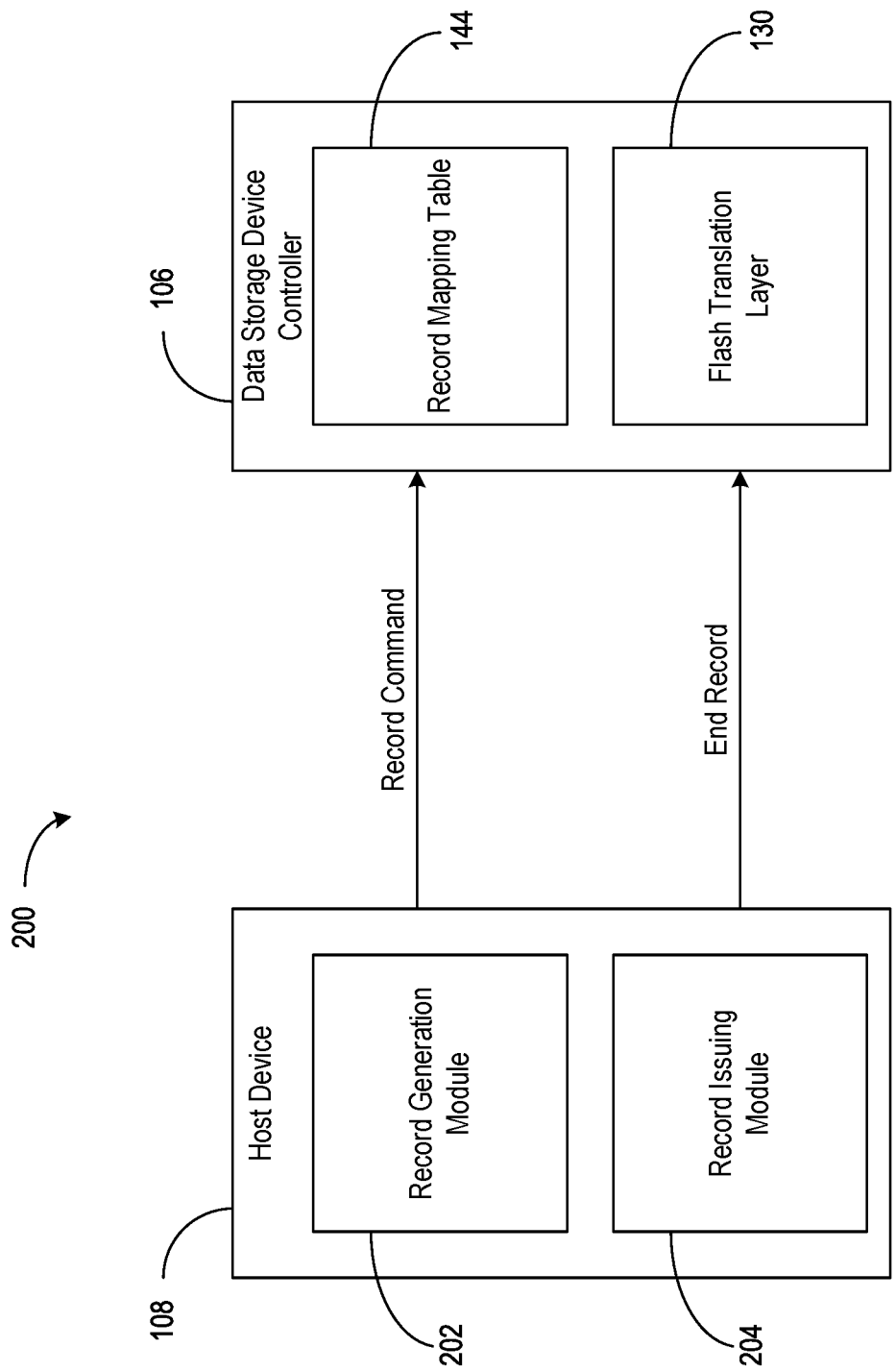
FIG. 2 is a block diagram of communication between a host device and the data storage device of FIG. 1, in accordance with some embodiments of the disclosure.

FIG. 2 provides an example communication process 200 between the host device 108 and the data storage device controller 106 for handling record commands. The host device 108 includes a record generation module 202 and a record issuing module 204. The record generation module 202 is configured to group commands and generate a record identifier (or record indicator) to create a record. The record issuing module 204 is configured to transmit the record identifier and the associated commands to the data storage device controller 106.

Figures 3, 4:
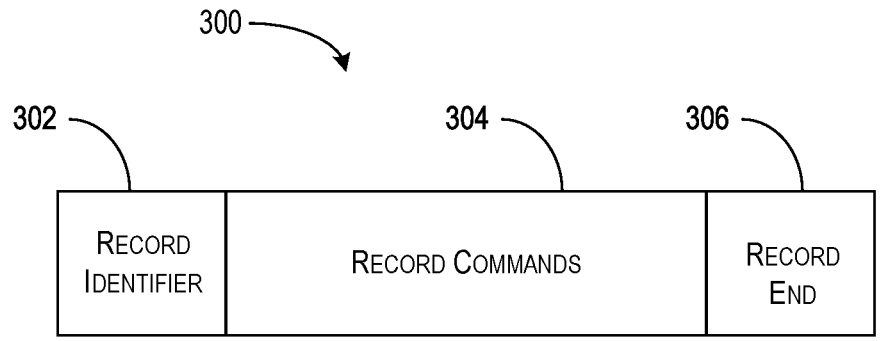
FIG. 3 is a block diagram of an example record command frame, in accordance with some embodiments of the disclosure.
FIG. 4 is a table illustrating an example record mapping table, in accordance with some embodiments of the disclosure.

FIG. 3 provides one example of an issued record frame 300. The record frame 300 includes a record identifier block 302, an associated commands block 304, and a record end block 306. The record identifier block 302 includes a record identifier (for example, a series of bits) with which subsequent commands (for example, a sequence of commands) within the associated commands block 304 may be associated. Each command within the associated commands block 304 may include a logical block address and data to be stored at the respective logical block address. Commands within the associated commands block 304 may have the same length (e.g., a same number of bits) or may have varying lengths (e.g., a varying number of bits from command to command). Data within the commands may be host data, associated metadata, or other dependent data. The record end block 306 may include an end command identifier, such as a flag (for example, a binary or analog flag) indicating an end of the record frame 300.

Returning to FIG. 2, the record issuing module 204 transmits the record frame 300 to the data storage device controller 106. The data storage device controller 106 receives the record frame 300 and, using the flash translation layer 130, creates one or more mapping entries within the record mapping table 144. The record mapping table 144 maintains a mapping between a record identifier and the location of commands associated with the record identifier. For example, the record mapping table 144 maps the value of the record identifier block 302 with the location of the data within the associated commands block 304. By mapping the record identifier and the associated commands, an access pattern can be replicated again by providing only the record identifier without sending actual storage commands.

The flash translation layer 130 also works to improve storage of the record frame 300 for future receipt. For example, the flash translation layer 130 routes the record frame 300 to a data stream to improve control and data pathing. The flash translation layer 130 may route, based on the record identifier, the record frame 300 into different streams (for example, slow and fast streams).

As previously noted, the record end block 306 operates as a stop command and indicates the end of the record frame 300. Accordingly, any data received after the record end block 306 is not associated with the record identifier. In some instances, the record frame 300 does not include a record end block 306. Instead, the data storage device controller 106 ends the communication process 200 when a certain number of commands is satisfied, when a total byte amount is satisfied, when a predetermined time period is satisfied, a maximum recording length is satisfied a max recording time is satisfied, or some other threshold is satisfied.

The data storage device controller 106 may be configured to provide various record operations. For example, specific endurance and latency values may be selected and known by the data storage device controller 106 for performing the above-noted record operations. The data storage device controller 106 may enable recording of all inputs and outputs experienced by the data storage device 102, recording all inputs and outputs on a particular queue, recording all inputs and outputs in a particular range of logical block addresses, recording of all read commands, recording of all write commands, and the like. Additionally, stopping of the recording may be configured such that the data storage device controller 106 stops recording commands after a predetermined period of time, stops recording commands after a predetermined amount of data, stops recording commands after a predetermined number of commands, or the like. In some implementations, recording of data persists across power cycles of the data storage device 102 and/or the host device 108.

In addition to recording the record identifiers and logical block addresses of commands associated with the record identifiers, the data storage device controller 106 may also record performance time associated with each command to the record mapping table 144. For example, in the case of Non-Volatile Memory Express (NVMe) protocols, the time for performing each command may be associated with doorbell ringing. In other implementations, the time recorded for each command may be associated with the command, with data transfer requests, or both. The data storage device controller 106 may refer to the time associated with commands and cache commands for performance when the required resources are available. Use of timing data may assist in smoothing out data rates. For example, if timing data is modified by the host device 108, or is provided by the host device 108, the data storage device controller 106 has an understanding of what rate the data was likely to be requested and what degree of caching is needed. For example, during movie playback, the movie may be stored on in the memory 104 for later playback at a rate that corresponds to the audio and video quality. As the data storage device controller 106 has an understanding of the needed playback time, the movie may be played on the host device 108 without the need for substantially buffering the movie in RAM.

FIG. 4 provides an example record mapping table 144. The record mapping table 144 includes a record identifier column 402 and a logical block address column 404. The record identifier column 402 includes each record identifier saved to the memory 124. The logical block address column 404 includes the logical block addresses of commands associated with the respective record identifier. Additionally, the logical block address column 404 includes the length of the command beginning at each respective logical block address. Accordingly, by accessing the record mapping table 144, the data storage device controller 106 can retrieve commands associated with a record identifier. In some instances, the record mapping table 144 further includes a performance time column 406. The performance time column 406 includes the expected performance time of the respective record identifier. In some implementations, the record mapping table 144 further includes a length column (not shown) indicating a length of the data associated with the respective identifier.

Figure 5:
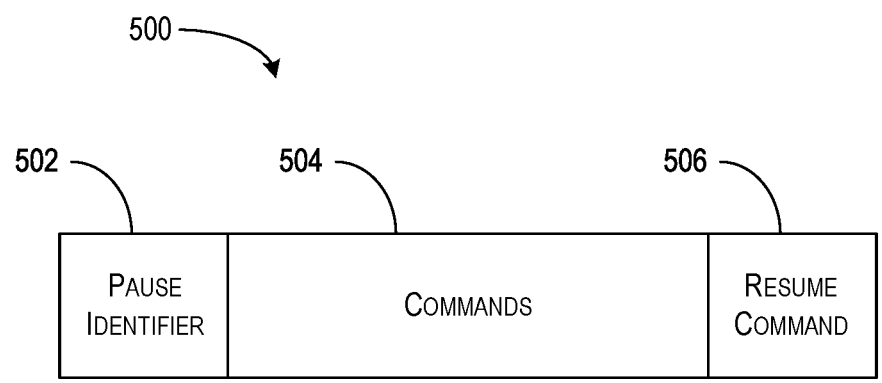
FIG. 5 is a block diagram of an example pause command frame, in accordance with some embodiments of the disclosure.

In some instances, it is likely that concurrent activity or other activity of a higher priority may occur while performing a recording operation. Such activity may adversely impact playback of recorded data. Accordingly, a pause command may be provided to pause the recording operation until such activity subsides. FIG. 5 provides an example issued pause frame 500. The pause frame 500 may be received by the data storage device controller 106 while performing a record operation. The pause frame 500 includes a pause identifier block 502, a subsequent commands block 504, and a resume command block 506. The pause identifier block 502 includes a pause identifier (for example, a series of bits) that indicates subsequent commands included in the subsequent commands block 504 are not associated with a record command. Accordingly, after a pause identifier is received by the data storage device controller 106, any subsequent commands are handled normally and without updating the record mapping table 144. The resume command block 506 includes a resume identifier that indicates a return to the record operation that was interrupted by the pause command. In some instances, the pause frame 500 does not include a resume command block 506, and instead resumes the record operation when command activity is reduced below a threshold.

Figure 6:
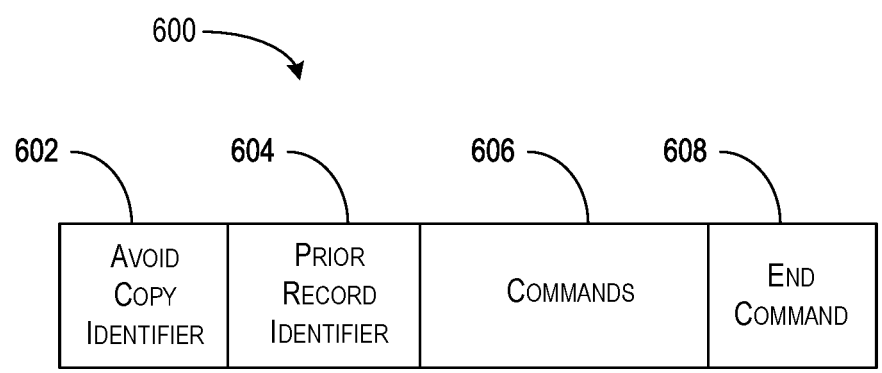
FIG. 6 is a block diagram of an example avoid copy command frame, in accordance with some embodiments of the disclosure.

In some instances, recordings may include additional data that is not needed, such as redundant data. Accordingly, only the overlap between a current workload being recorded and a previous recording may be captured by the data storage device controller 106. FIG. 6 provides an example avoid copy frame 600 that is configured to record new data not present in an existing command. The avoid copy frame 600 includes an avoid copy identifier block 602, a prior record identifier block 604, a commands block 606, and a record end block 608. The avoid copy identifier block 602 includes an avoid copy identifier (for example, a series of bits) that indicates an avoid copy command. The avoid copy identifier acts as a record identifier and indicates an incoming new record. The prior record identifier block 604 includes an existing record identifier of a record within the record mapping table 144. Each command within the commands block 606 may include a logical block address and data to be stored at the respective logical block address. The record end block 608 may be a flag (for example, a binary or analog flag) indicating an end of the avoid copy frame 600.

When the data storage device controller 106 receives the avoid copy frame 600, the data storage device controller 106 compares the commands within the commands block 606 with the commands associated with the record identified by the prior record identifier block 604. To retrieve the commands associated with the record identified by the prior record identifier block 604, the data storage device controller 106 refers to the record mapping table 144. The data storage device controller 106 determines commands present within both the record identified by the prior record identifier block 604 and the commands within the commands block 606. The data storage device controller 106 records only the commands that are present within the commands block 606 but are not present within the record identified by the prior record identifier block 604 to the record mapping table 144. In some instances, the data storage device controller 106 also only saves the commands that are present within the commands block 606 but are not present within the record identified by the prior record identifier block 604 to the memory 104.

Commands provided herein are merely examples, and further record commands may be implemented. For example, an overwrite existing record command may indicate a particular record identifier to overwrite, replacing the commands within the logical block address column 404 for the associated record identifier.

Playback Commands

Once records are established in the record mapping table 144, the commands associated with the record may be retrieved and performed with a "playback" command. For example, with reference to FIG. 1, the host device 108 issues a playback command when the host device 108 determines that a set of data associated with a prior record command are to be accessed again. The host device 108 transmits the playback command to the data storage device controller 106. The data storage device controller 106, upon receiving the playback command, retrieves all data associated with a record as indicated by the playback command. For example, the data storage device controller 106 accesses the related recording mapping entry in the record mapping table 144, identifies the associated physical memory addresses, and plays back the commands stored in said addresses as a sequence of data.

Figure 7:
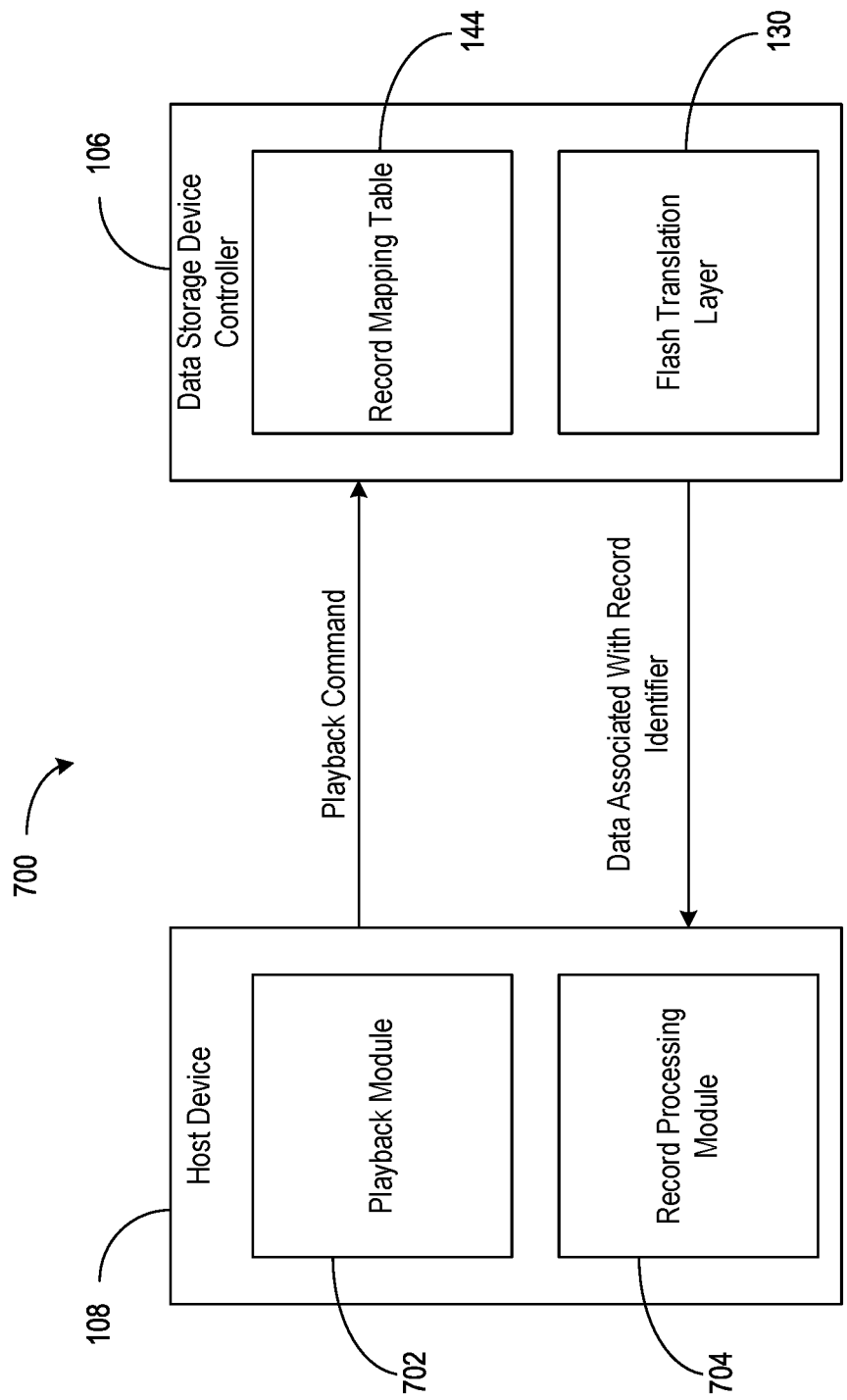
FIG. 7 is a block diagram of another communication between a host device and the data storage device of FIG. 1, in accordance with some embodiments of the disclosure.

FIG. 7 provides an example communication process 700 between the host device 108 and the data storage device controller 106 for handling playback commands. The host device 108 includes a playback module 702 and a record processing module 704. The playback module 702 is configured to generate a playback command to retrieve a record (e.g., commands and/or data associated with a record identifier). The record processing module 704 is configured to process data associated to all commands retrieved from the record requested by the playback module 702.

Figure 8:
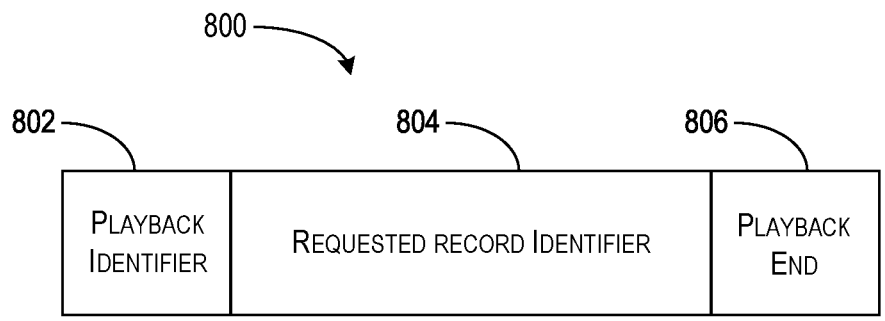
FIG. 8 is a block diagram of an example playback command frame, in accordance with some embodiments of the disclosure.

FIG. 8 provides one example of an issued playback frame 800. The playback frame 800 includes a playback identifier block 802, a requested record identifier block 804, and a playback end block 806. The playback identifier block 802 includes a playback identifier (for example, a series of bits) indicating that playback is being initiated. The requested record identifier block 804 includes a record identifier of the requested record. The playback end block 806 may be a flag (for example, a binary or analog flag) indicating an end of the playback frame 800.

Returning to FIG. 8, when the data storage device controller 106 receives the playback frame 800, the data storage device controller 106 retrieves, using the record mapping table 144, all data associated with the record indicated by the requested record identifier block 804. The data storage device controller 106 refers to the associated logical block addresses (from logical block address column 404) to identify the physical location of the data within the memory 104. In some instances, the data storage device controller 106 implements the flash translation layer 130 to retrieve logical block addresses from the record mapping table 144 and access data from the memory 104. The data is played back as a sequence of data. The data may be provided to the host device 108, may be commands performed directly by the data storage device controller 106, or a combination thereof.

In some instances, playback of a record may be automatically entered if a trigger logical block address (for example, the first logical block address in a record) is accessed by the data storage device controller 106 or the host device 108. In some examples, if a predetermined amount of time passes and the other logical block addresses associated with the record are not accessed, then the playback stops. Varying degrees of affirmation of the recording may be implemented, such as the access of several pieces of data at the start of the recording, continued access to data in the recording, rate of access of the recording, and the like.

In some instances, the host device 108 may enable playback of a record from an offset. For example, the host device 108 may indicate an offset to skip forward to a particular logical block address of the record (for example, begin at an initial playback command), rather than starting from the beginning of the record. Alternatively, the offset may indicate a logical block address before the beginning of the record or may refer to a logical block address behind the current position of a playback operation. Such an offset may be useful for gaming applications, for example if a saved game is loaded, a level is repeated, or similar instances where operations are repeated.

Figure 9:
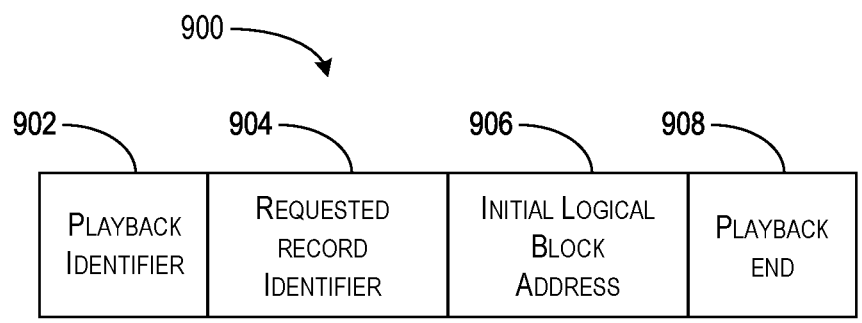
FIG. 9 is a block diagram of another example playback command frame, in accordance with some embodiments of the disclosure.

FIG. 9 an example playback frame 900. The playback frame 900 includes a playback identifier block 902, a requested record identifier block 904, an initial logical block address block 906, and a playback end block 908. The playback identifier block 902 includes a playback identifier (for example, a series of bits) indicating that playback is being initiated. The requested record identifier block 904 includes a record identifier of the requested record. The initial logical block address block 906 includes an initial logical block address at which the data storage device controller 106 begins the playback of the record. In some instances, the initial logical block address block 906 includes an offset value indicating an offset of the beginning of the playback operation. The playback end block 908 may be a flag (for example, a binary or analog flag) indicating an end of the playback frame 900.

In some implementations, the host device 108 may define multiple record identifiers and playback identifiers that enable several groups of multiple commands (for example, combining several records) to improve the command relation in a given application.

Additional Commands and Processes

Figure 10:
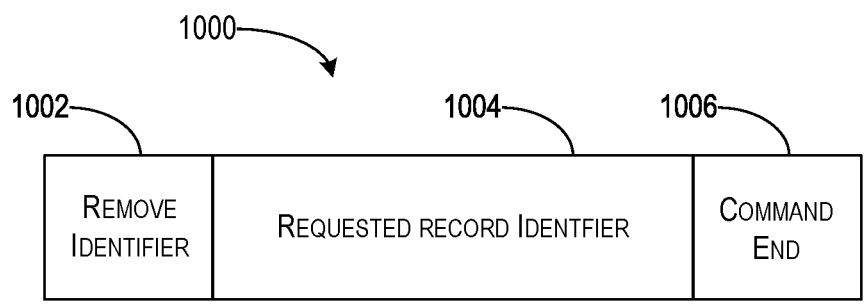
FIG. 10 is a block diagram of an example remove command frame, in accordance with some embodiments of the disclosure.

In some implementations, a "remove" or "forget" command is transmitted by the host device 108 to remove a record from the record mapping table 144. FIG. 10 provides an example remove frame 1000. The remove frame 1000 includes a remove identifier block 1002, a requested record identifier block 1004, and a command end block 1006. The remove identifier block 1002 includes a remove identifier (for example, a series of bits) indicating that a remove operation is being initiated. The requested record identifier block 1004 includes a record identifier of the requested record to be removed. The command end block 1006 may be a flag indicating an end of the remove frame 1000. Upon receipt of the remove frame 1000, the data storage device controller 106, implementing the flash translation layer 130, deletes the indicated record from the record mapping table 144, including the associated logical block addresses and performance times. In some instances, the remove operation only removes data from the record mapping table 144, and the data remains stored in the physical locations of the memory 104. In other instances, the remove operation removes the data from both the record mapping table 144 and the memory 104.

In some instances, the remove operation occurs automatically by the data storage device controller 106 when the data at the starting logical block address associated with a record is overwritten. The data storage device controller 106, implementing the flash translation layer 130, detects the overwriting of the logical block address and erases the respective recording entry in the record mapping table 144. In another instance, the remove operation may occur automatically by the data storage device controller 106 based on a timed expiration of the record. In one example, the record mapping table 144 can store a maximum number of recordings. When the maximum number of recordings is exceeded, the data storage device controller 106 may remove the first record, the record implemented the least, the record that has had the longest amount of time since the last playback, or based on any other suitable removal criteria.

In some instances, record entries in the record mapping table 144 may be output by the data storage device controller 106 to the host device 108. For example, the host device 108 may request a record from the data storage device controller 106. The data storage device controller 106 transmits a record in the record identifier column 402 and the respective logical block addresses and time performance values within the logical block address column 404 and the performance time column 406 to the host device 108. This output operations differs from the playback operation. Particularly, transmitting the record relates to data stored in the record mapping table 144, while playback operations relate to transmitting data stored in the memory 104. Accordingly, recording performed on one device may be transferred to another device. Additionally, by accessing the record mapping table 144 and, particularly, the performance time column 406, the host device 108 may see the performance of applications without having to actively track the applications, enabling more efficient host performance.

Additionally, full entries of the record mapping table 144 may be provided directly to the data storage device controller 106. In this manner, recordings may be provided directly to the data storage device 102 without the data storage device 102 performing a recording operation. In one example, the data storage device 102 requests a record from the host device 108. In another example, the host device 108 may automatically transmit the records to the data storage device 102. Providing completed records to the data storage device 102 may increase performance during downloads, major write operations or cache operations, backup operations, and the like. As one example, transmitting a record enables the data storage device controller 106 to know the majority of items that are read into for backup during the day, and writes that information over a prior backup at night during a period of low activity.

Other options for inputting recordings to devices include using vendor-unique commands (or similar classes of commands) to facilitate dummy inputs/outputs. The dummy reads and writes could target the recording function of the device with or without live inputs/outputs. Such a method may make it easier to convey recording information. For example, a real write operation may follow a dummy operation on a logical block address range to ensure that the data storage device controller 106 stores a record. When a real write command does not follow the dummy operation on the logical block address range, the data storage device controller 106 may disregard the data of the dummy command.

Accordingly, embodiments described herein provide for maintaining a history of control data (for example, a MIP record) from which processing activity such as hot count operations, garbage collection operations, update manager operations, and group address table activity is readily available for failure investigation and recovery.

Figure 11:
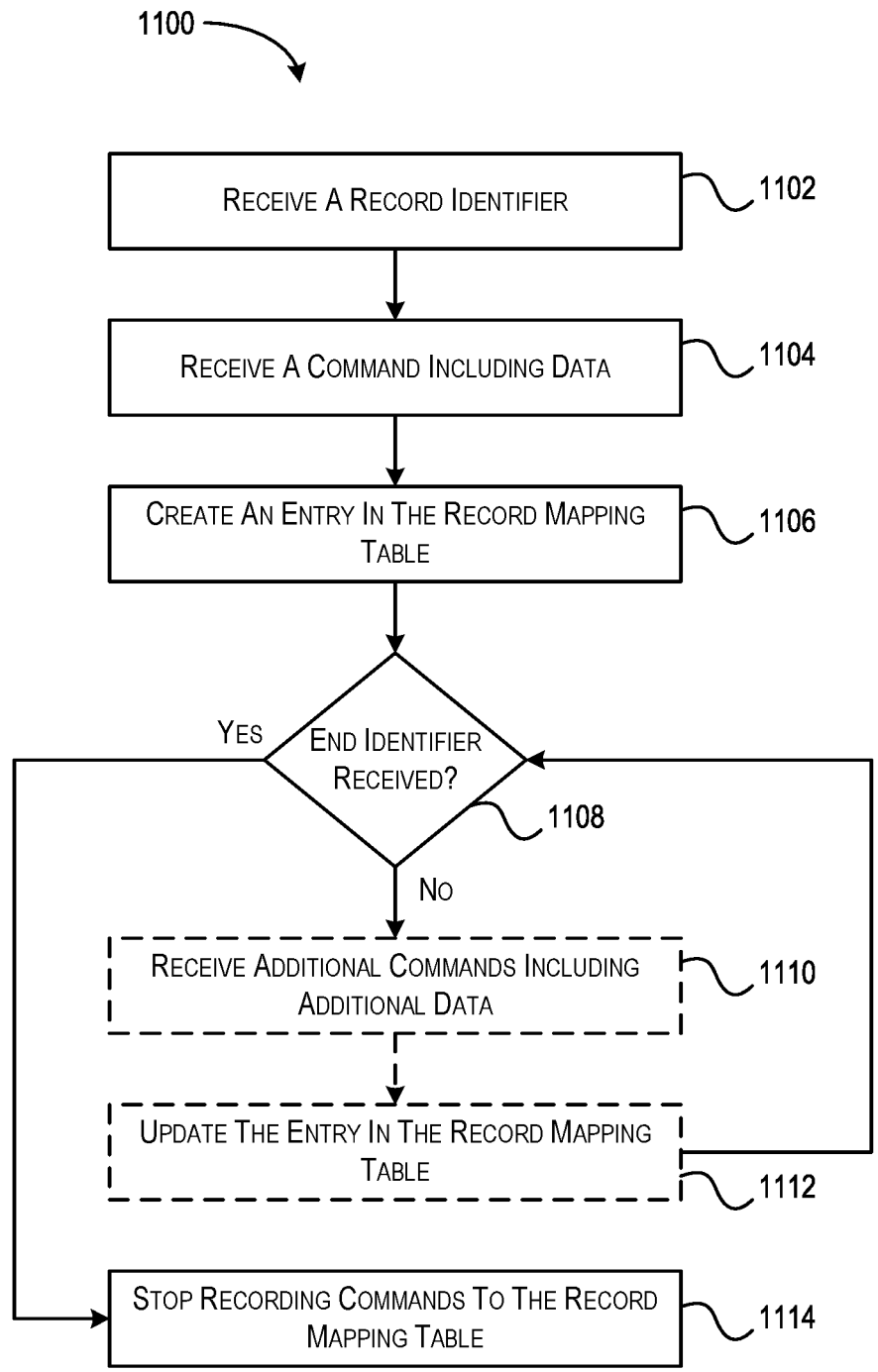
FIG. 11 is a flowchart illustrating an example method of performing a recording operation, in accordance with some embodiments of the disclosure.

FIG. 11 is a flowchart illustrating a record operation process 1100, in accordance with various aspects of the present disclosure. FIG. 11 is described with respect to the data storage device controller 106 of FIG. 1.

As illustrated in FIG. 11, the record operation process 1100 includes the data storage device controller 106 receiving a record identifier (at block 1102). The record operation process 1100 includes the data storage device controller 106 receiving a command including data (at block 1104). The record operation process 1100 includes the data storage device controller 106 creating an entry in the record mapping table 144 (at block 1106). For example, the data storage device controller 106 begins to receive a record frame 300 including a record identifier block 302 and associated commands block 304. The data storage device controller 106 stores the record identifier in the record identifier column 402 and associates the record identifier with a logical block address of the command in the logical block address column 404.

The record operation process 1100 includes the data storage device controller 106 determining whether an end identifier is received (at decision block 1108, and in some examples, after optional blocks 1110 and 1112). For example the data storage device controller 106 determines whether the record end block 306 of the record frame 300 is received. When the data storage device controller 106 determines the end identifier is not received ("NO" at decision block 1108), the data storage device controller 106 continues to optional block 1110 and waits to receive additional commands or the end identifier. When the data storage device controller 106 determines the end identifier is received ("YES" at decision block 1108), the data storage device controller 106 proceeds to block 1114. The record operation process 1100 includes the data storage device controller 106 stopping recording commands to the record mapping table 144 (at block 1114).

In some examples, the record operation process 1100 may include the data storage device controller 106 receiving additional commands including additional data (at optional block 1110). For example, the data storage device controller 106 receives a second command included in the associated commands block 304. The record operation process 1100 may include the data storage device controller 106 updating the entry in the record mapping table 144 (at optional block 1112). For example, the data storage device controller 106 updates the logical block address column 404 to include a logical block address associated with the second command.

Figure 12:
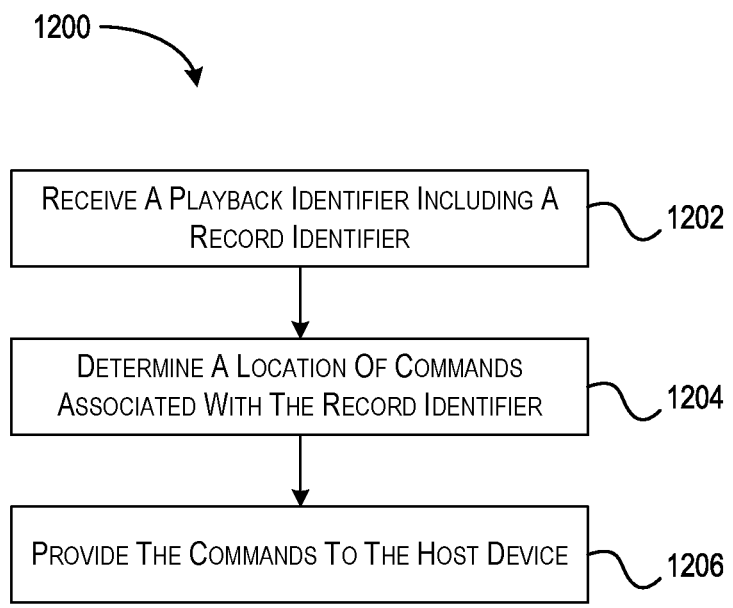
FIG. 12 is a flowchart illustrating an example method of performing a playback operation, in accordance with some embodiments of the disclosure.

FIG. 12 is a flowchart illustrating a playback operation process 1200, in accordance with various aspects of the present disclosure. FIG. 12 is described with respect to the data storage device controller 106 of FIG. 1.

The playback operation process 1200 includes the data storage device controller 106 receiving a playback identifier including a record identifier (at block 1202). For example the data storage device controller 106 receives, from the host device 108, a playback frame 800 including the playback identifier block 802 and the requested record identifier block 804.

The playback operation process 1200 includes the data storage device controller 106 determining a location of commands associated with the record identifier (at block 1204). For example, the data storage device controller 106 refers to the record mapping table 144 to identify a logical block address of commands associated with the record identifier.

The playback operation process 1200 includes the data storage device controller 106 providing the commands to the host device 108 (at block 1206). For example, the data storage device controller 106 transmits the data associated with the record identifier to the host device 108 with the host interface 116.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

What is claimed is:

1. A data storage controller, comprising:
   a memory interface configured to interface with a memory;
   a controller memory including a storage firmware and a record mapping table; and
   a processor communicatively connected to the controller memory, wherein the processor, when executing the storage firmware, is configured to:
   receive a record identifier,
   receive a command including data to be stored in the memory, the command received after the record identifier, and
   create an entry in the record mapping table associating the record identifier with a logical block address of the command in the memory.

2. The data storage controller of claim 1, wherein the processor, when executing the storage firmware, is further configured to:
   receive a second command including second data to be stored in the memory, the second command received after the record identifier and the command, and
   update the entry in the record mapping table associating the record identifier with a logical block address of the second command in the memory.

3. The data storage controller of claim 1, wherein the processor, when executing the storage firmware, is further configured to:
   receive an end command identifier associated with the record identifier, the end command identifier received after the record identifier and the command,
   receive, after receiving the end command identifier, a second command including second data to be stored in the memory, and
   store the second data in the memory without updating the record mapping table.

4. The data storage controller of claim 3, wherein the processor, when executing the storage firmware, is further configured to:
   receive a second entry including a second record identifier and a second logical block address associated with the second record identifier, and
   update the record mapping table to include the second entry.

5. The data storage controller of claim 1, wherein the record mapping table includes:
   a record identifier column configured to store the record identifier,
   a logical block address column configured to store the logical block address of the command associated with the record identifier and stored in the memory, and
   a performance time column configured to store an expected performance time of the command associated with the record identifier.

6. The data storage controller of claim 1, wherein the processor, when executing the storage firmware, is further configured to:
   receive a pause identifier associated with the record identifier, the pause identifier received after the record identifier and the command,
   receive, after receiving the pause identifier, a second command including second data to be stored in the memory, store the second data in the memory without updating the entry in the record mapping table, receive a resume identifier associated with the record identifier, the resume identifier received after the second command, receive, after receiving the resume identifier, a third command including third data to be stored in the memory, and update the entry in the record mapping table associating the record identifier with a logical block address of the third command.

7. The data storage controller of claim 1, wherein the command is a first command, and wherein the processor, when executing the storage firmware, is further configured to:

receive an avoid copy identifier, the avoid copy identifier received after the record identifier and the command, receive, after receiving the avoid copy identifier, a plurality of second commands including second data to be stored in the memory, determine whether the plurality of second commands include the first command, and update, when the plurality of second commands include the first command, the record mapping table to include the plurality of second commands without updating the record mapping table to include the first command.

8. The data storage controller of claim 1, wherein the processor, when executing the storage firmware, is further configured to:

receive a playback identifier including the record identifier, determine, using the record mapping table and the record identifier, a location of the command in the memory, and provide data associated with the command to an external device.

9. The data storage controller of claim 1, wherein the processor, when executing the storage firmware, is further configured to:

receive a playback identifier including the record identifier and an offset value, determine, using the record mapping table, the record identifier, and the offset value, an initial playback command, and provide data associated with the initial playback command to an external device.

10. The data storage controller of claim 9, wherein the offset value is a second logical block address.

11. The data storage controller of claim 1, wherein the processor, when executing the storage firmware, is further configured to:

receive, from an external device, a request for the entry in the record mapping table, and provide the entry to the external device.

12. A method comprising:

receiving, with a storage controller executing a storage firmware, a record identifier;

receiving, with the storage controller, a command including data to be stored in a memory, the command received after the record identifier; and creating, with the storage controller, an entry in a record mapping table associating the record identifier with a logical block address of the command.

13. The method of claim 12, further comprising:

receiving, with the storage controller, a second command including second data to be stored in the memory, the second command received after the record identifier and the command, and updating, with the storage controller, the entry in the record mapping table associating the record identifier with a logical block address of the second command.

14. The method of claim 12, further comprising:

receiving, with the storage controller, an end command identifier, the end command identifier received after the record identifier and the command, receiving, with the storage controller, after receiving the end command identifier, a second command including second data to be stored in the memory, and storing the second data in the memory without updating the record mapping table.

15. The method of claim 12, further comprising:

receive a pause identifier, the pause identifier received after the record identifier and the command, receive, after receiving the pause identifier, a second command including second data to be stored in the memory, store the second data in the memory without updating the record mapping table, receive a resume identifier, the resume identifier received after the pause identifier and the second command, receive, after receiving the resume identifier, a third command including third data to be stored in the memory, and update the entry in the record mapping table associating the record identifier with a logical block address of the third command.

16. The method of claim 12, further comprising:

receiving a playback identifier including the record identifier, determining, using the record mapping table and the record identifier, a location of the command in the memory, and providing data associated with the command to an external device.

17. The method of claim 12, further comprising:

receiving a playback identifier including the record identifier and an offset value, determining, using the record mapping table, the record identifier, and the offset value, an initial playback command, and providing data associated with the initial playback command to an external device.

18. A memory device that supports a record mapping table for records indicating a sequence of commands, the memory device comprising:

a host interface configured to connect to an external electronic device;

a memory including the record mapping table and a storage firmware; and a controller coupled to the memory and the host interface, the controller configured to:

receive, from the external electronic device, a record identifier, receive, from the external electronic device, the sequence of commands including data, the sequence of commands received after the record identifier, and create an entry in the record mapping table associating the record identifier with a logical block address of the sequence of commands.

19. The memory device of claim 18, wherein the controller is further configured to:
- receive, from the external electronic device, a playback identifier including the record identifier,
- determine, using the record mapping table and the record identifier, a location of the sequence of commands, and
- provide the sequence of commands to the external electronic device.

20. The memory device of claim 18, wherein the controller is further configured to:
- receive, from the external electronic device, a playback identifier including the record identifier and an offset value,
- determine, using the record mapping table, the record identifier, and the offset value, an initial playback command of the sequence of commands, and
- provide, beginning with the initial playback command, the sequence of commands to the external electronic device.

\* \* \* \* \*